United States Patent
Slavenburg

(10) Patent No.: US 9,094,678 B1
(45) Date of Patent: Jul. 28, 2015

(54) SYSTEM, METHOD, AND COMPUTER PROGRAM PRODUCT FOR INVERTING A POLARITY OF EACH CELL OF A DISPLAY DEVICE

(75) Inventor: Gerrit A. Slavenburg, Fremont, CA (US)

(73) Assignee: NVIDIA Corporation, Santa Clara, CA (US)

(*) Notice: Subject to any disclaimer, the term of this patent is extended or adjusted under 35 U.S.C. 154(b) by 810 days.

(21) Appl. No.: 13/248,960

(22) Filed: Sep. 29, 2011

Related U.S. Application Data

(60) Provisional application No. 61/387,947, filed on Sep. 29, 2010.

(51) Int. Cl.
*H04N 13/04* (2006.01)
*H04N 7/171* (2011.01)
*G09G 3/36* (2006.01)

(52) U.S. Cl.
CPC ......... *H04N 13/0434* (2013.01); *G09G 3/3614* (2013.01); *H04N 7/1716* (2013.01); *H04N 13/0436* (2013.01); *H04N 13/0438* (2013.01)

(58) Field of Classification Search
CPC .............. G09G 3/3614; G09G 3/3648; G09G 2320/0209; G09G 3/36; G09G 3/3611; G09G 2230/00; G09G 2320/0252; G09G 2340/16; G09G 3/002; G09G 3/003; G09G 3/3655; H04N 13/0438; H04N 13/0497; H04N 13/0434; G02B 27/2264
USPC .......... 348/42, 51; 345/87, 96, 209, 211, 419, 345/690
See application file for complete search history.

(56) References Cited

U.S. PATENT DOCUMENTS

| | | | |
|---|---|---|---|
| 4,912,557 A | 3/1990 | Faroudja |
| 5,486,868 A | 1/1996 | Shyu et al. |
| 5,568,314 A | 10/1996 | Omori et al. |
| 5,796,373 A | 8/1998 | Ming-Yen |
| 5,878,216 A | 3/1999 | Young et al. |
| 5,943,504 A | 8/1999 | Flurry et al. |
| 5,963,200 A | 10/1999 | Deering et al. |
| 5,976,017 A | 11/1999 | Omori et al. |
| 6,002,518 A | 12/1999 | Faris |

(Continued)

FOREIGN PATENT DOCUMENTS

| | | |
|---|---|---|
| CN | 101371292 A | 2/2009 |
| CN | 101415126 A | 4/2009 |

(Continued)

OTHER PUBLICATIONS

Office Action from Chinese Application No. 200780001629.6 mailed on Feb. 24, 2010.

(Continued)

*Primary Examiner* — Sath V Perungavoor
*Assistant Examiner* — Nathnael Aynalem
(74) *Attorney, Agent, or Firm* — Zilka-Kotab, PC

(57) ABSTRACT

A system, method, and computer program product are provided for determining that a display device is operating in a three-dimensional mode. Further, in response to the determination that the display device is operating in the three-dimensional mode, inverting a polarity of each cell of the display device every N number of frames. Additionally, the N number of frames is even and includes at least two frames.

19 Claims, 5 Drawing Sheets

(56) References Cited

U.S. PATENT DOCUMENTS

| | | | |
|---|---|---|---|
| 6,011,581 | A | 1/2000 | Swift et al. |
| 6,529,175 | B2 | 3/2003 | Tserkovnyuk et al. |
| 6,532,008 | B1 | 3/2003 | Guralnick |
| 6,977,629 | B2 | 12/2005 | Weitbruch et al. |
| 7,061,477 | B1 | 6/2006 | Noguchi |
| 7,103,702 | B2 | 9/2006 | Funamoto |
| 7,215,356 | B2 | 5/2007 | Lin et al. |
| 7,256,791 | B2 | 8/2007 | Sullivan et al. |
| 7,385,625 | B2 | 6/2008 | Ohmura et al. |
| 7,490,296 | B2 | 2/2009 | Feldman et al. |
| 7,502,010 | B2 | 3/2009 | Kirk |
| 7,724,211 | B2 | 5/2010 | Slavenburg et al. |
| 8,169,467 | B2 | 5/2012 | Slavenburg et al. |
| 8,274,448 | B1 | 9/2012 | Cook |
| 8,363,096 | B1 | 1/2013 | Aguirre |
| 8,482,605 | B2 | 7/2013 | Myokan |
| 8,576,208 | B2 | 11/2013 | Slavenburg et al. |
| 8,581,833 | B2 | 11/2013 | Slavenburg et al. |
| 8,872,754 | B2 | 10/2014 | Slavenburg et al. |
| 8,878,904 | B2 | 11/2014 | Slavenburg et al. |
| 2002/0007723 | A1 | 1/2002 | Ludwig |
| 2002/0196199 | A1 | 12/2002 | Weitbruch et al. |
| 2003/0030608 | A1* | 2/2003 | Kurumisawa et al. ......... 345/87 |
| 2003/0038807 | A1 | 2/2003 | Demos et al. |
| 2003/0234892 | A1 | 12/2003 | Hu et al. |
| 2004/0130645 | A1 | 7/2004 | Ohmura et al. |
| 2006/0012676 | A1 | 1/2006 | Tomita |
| 2006/0146003 | A1 | 7/2006 | Diefenbaugh et al. |
| 2006/0268104 | A1 | 11/2006 | Cowan et al. |
| 2007/0091058 | A1 | 4/2007 | Nam et al. |
| 2007/0165942 | A1 | 7/2007 | Jin et al. |
| 2007/0229395 | A1 | 10/2007 | Slavenburg et al. |
| 2007/0229487 | A1 | 10/2007 | Slavenburg et al. |
| 2007/0247478 | A1* | 10/2007 | Hagino et al. ................ 345/698 |
| 2008/0192034 | A1 | 8/2008 | Chen et al. |
| 2008/0252578 | A1* | 10/2008 | Kim et al. ....................... 345/87 |
| 2009/0122052 | A1 | 5/2009 | Huang et al. |
| 2009/0132951 | A1 | 5/2009 | Feldman et al. |
| 2009/0150776 | A1 | 6/2009 | Feldman et al. |
| 2009/0150777 | A1 | 6/2009 | Feldman et al. |
| 2009/0179845 | A1 | 7/2009 | Song et al. |
| 2010/0020062 | A1 | 1/2010 | Liou et al. |
| 2010/0033555 | A1 | 2/2010 | Nagase et al. |
| 2010/0045690 | A1* | 2/2010 | Handschy et al. ............ 345/549 |
| 2010/0066820 | A1 | 3/2010 | Park et al. |
| 2010/0194733 | A1 | 8/2010 | Lin et al. |
| 2010/0201791 | A1 | 8/2010 | Slavenburg et al. |
| 2010/0208043 | A1 | 8/2010 | Hoffman |
| 2010/0231696 | A1 | 9/2010 | Slavenburg et al. |
| 2010/0231698 | A1 | 9/2010 | Nakahata et al. |
| 2010/0253665 | A1* | 10/2010 | Choi et al. .................... 345/211 |
| 2010/0289883 | A1 | 11/2010 | Goris et al. |
| 2011/0012904 | A1 | 1/2011 | Slavenburg et al. |
| 2011/0032440 | A1 | 2/2011 | Robinson et al. |
| 2011/0063424 | A1 | 3/2011 | Matsuhiro et al. |
| 2011/0074773 | A1 | 3/2011 | Jung |
| 2011/0090319 | A1 | 4/2011 | Kim et al. |
| 2011/0109656 | A1 | 5/2011 | Nakagawa et al. |
| 2011/0109733 | A1 | 5/2011 | Kim et al. |
| 2011/0115994 | A1 | 5/2011 | Jung et al. |
| 2011/0148860 | A1 | 6/2011 | Tsai et al. |
| 2011/0157332 | A1 | 6/2011 | Kim et al. |
| 2011/0187705 | A1* | 8/2011 | Lan et al. ..................... 345/419 |
| 2011/0205335 | A1 | 8/2011 | Kim et al. |
| 2011/0205625 | A1 | 8/2011 | Auld |
| 2011/0221747 | A1 | 9/2011 | Kim et al. |
| 2011/0267341 | A1 | 11/2011 | Jung et al. |
| 2011/0310234 | A1 | 12/2011 | Sarma et al. |
| 2012/0002123 | A1 | 1/2012 | Kang |
| 2012/0007970 | A1 | 1/2012 | Ko |
| 2012/0013614 | A1 | 1/2012 | Matsuhiro et al. |
| 2012/0019637 | A1 | 1/2012 | Ko et al. |
| 2012/0033053 | A1 | 2/2012 | Park et al. |
| 2012/0038624 | A1* | 2/2012 | Slavenburg .................... 345/419 |
| 2012/0075437 | A1 | 3/2012 | Slavenburg et al. |
| 2013/0038684 | A1 | 2/2013 | Slavenburg |
| 2013/0271582 | A1 | 10/2013 | Slavenburg et al. |

FOREIGN PATENT DOCUMENTS

| | | |
|---|---|---|
| CN | 101697595 A | 4/2010 |
| CN | 101860766 A | 10/2010 |
| CN | 102034449 A | 4/2011 |
| CN | 102055993 A | 5/2011 |
| CN | 102111627 A | 6/2011 |
| CN | 102160386 A | 8/2011 |
| CN | 102378028 A | 3/2012 |
| EP | 1363264 A2 | 11/2003 |
| EP | 2228998 A2 | 9/2010 |
| EP | 2262272 A2 | 12/2010 |
| EP | 2339864 A2 | 6/2011 |
| EP | 2362666 A1 | 8/2011 |
| EP | 2365697 A2 | 9/2011 |
| GB | 2475367 A | 5/2011 |
| JP | 01073892 A2 | 3/1989 |
| JP | H09-051552 | 2/1997 |
| JP | 2000-004451 | 1/2000 |
| JP | 2000284224 A2 | 10/2000 |
| JP | 2001045524 A2 | 2/2001 |
| JP | 2001154640 A | 6/2001 |
| JP | 2003202519 A | 7/2003 |
| JP | 2007110683 A2 | 4/2007 |
| JP | 2007114793 A | 5/2007 |
| JP | 2009152897 A | 7/2009 |
| KR | 20040001831 A | 1/2000 |
| KR | 20060007662 A | 1/2006 |
| KR | 20070077863 A | 7/2007 |
| KR | 20070115524 A | 12/2007 |
| KR | 20100022653 A | 3/2010 |
| KR | 20100032284 A | 3/2010 |
| KR | 20100035774 A | 4/2010 |
| WO | 99/31884 A1 | 6/1999 |
| WO | WO2007126904 A2 | 11/2007 |
| WO | 2009069026 A2 | 6/2009 |
| WO | WO2009069026 A2 | 6/2009 |
| WO | 2010032927 A2 | 3/2010 |
| WO | WO2010032927 A2 | 3/2010 |
| WO | WO2010064557 A1 | 6/2010 |
| WO | WO2010107227 A2 | 9/2010 |
| WO | WO2011028065 A2 | 3/2011 |

OTHER PUBLICATIONS

Notice of Allowance and Fee(s) Due from U.S. Appl. No. 11/462,529 dated Feb. 8, 2010.

Final Office Action from U.S. Appl. No. 11/462,529 dated Dec. 2, 2009.

Cook, D., U.S. Appl. No. 11/532,005 filed Sep. 14, 2006.

International Preliminary Report on Patentability from PCT Application No. PCT/US2007/007702 issued on Sep. 30, 2008.

Non-Final Office Action from U.S. Appl. No. 11/462,529 dated Apr. 16, 2009.

International Search Report and Written Opinion from PCT Application No. PCT/US2007/007702 mailed on Apr. 2, 2008.

Non-Final Office Action from U.S. Appl. No. 12/854,100 dated Mar. 16, 2012.

Notice of Allowance from U.S. Appl. No. 11/462,535 dated Mar. 2, 2012.

Non-Final Office Action from U.S. Appl. No. 12/787,346 dated Jun. 8, 2012.

Notice of Grant of Patent Right for Invention from Chinese Patent Application No. 201010522450.9 dated Jul. 19, 2012 (Translation Only).

Office Action from Chinese Patent Application No. 201010522450.9 dated Dec. 23, 2011.

Notice of Allowance from Taiwan Patent Application No. 096111054 dated Feb. 29, 2012.

Notice of Allowance from Korean Patent Application No. 10-2007-0031168 dated Jan. 13, 2011.

Combined Search and Examination Report from UK Patent Application No. GB1112746.1 dated Nov. 10, 2011.

(56) References Cited

OTHER PUBLICATIONS

Non-Final Office Action from U.S. Appl. No. 12/765,771 dated May 25, 2012.
Non-Final Office Action from U.S. Appl. No. 11/462,535 dated Oct. 26, 2011.
Office Action from Canadian Patent Application No. 2,646,439 dated Oct. 28, 2011.
Examination Report from European Patent Application No. 07 754 251.2 dated Dec. 7, 2010.
Office Action from Taiwan Patent Application No. 096111054 dated Oct. 31, 2011.
Notice of Allowance from Korean Patent Application No. 10-2010-0092504 dated Sep. 28, 2011.
Decision to Grant from Japanese Patent Application No. 2009-502980 dated Sep. 20, 2011.
Schutten, R., U.S. Appl. No. 13/247,907, filed Sep. 28, 2011.
Cook, D., U.S. Appl. No. 11/531,995, filed Sep. 14, 2006.
Notice of Reasons for Rejection from Japanese Application No. 2009-502980 mailed Feb. 8, 2011.
Notice of Preliminary Rejection from Korean Application No. 10-2010-0092504 mailed Dec. 28, 2010.
Notice of Preliminary Rejection from Korean Application No. 10-2007-0031168 mailed Jul. 22, 2010.
Extended European Search Report from Application No. 07754251.2 mailed Sep. 9, 2009.
Final Notice of Reasons for Rejection from Japanese Application No. 2009-502980 mailed Jun. 21, 2011.
Non-Final Office Action from U.S. Appl. No. 11/462,535 dated May 24, 2011.
i-O Display Systems, "Featured Products", retrieved from http://web.archive.org/web/20060812053513/http://www.i-glassesstore.com/index.html on Aug. 12, 2006, (2 pages).
International Telecommunication Union: "Characteristics of B,G/PAL and M/NTSC Television Systems (Excerpt from ITU-R BT.470-5 Conventional Television Systems)", Feb. 1998, retrieved from http://www.kolumbus.fi/pami1/video/pal_ntsc.html on Jun. 8, 2011, (5 pages).
Video Electronics Standards Association (VESA), "Coordinated Video Timings (CVT) Standard V1.1", Sep. 10, 2003, Milpitas, CA, USA, retrieved from http://web.archive.org/web/20040204215505/http://www.vesa.org/summary/sumcvt.htm on Jun. 8, 2011, (6 pages).
Notice of Grant of Patent Right for Invention from Chinese Application No. 200780001629.6 issued Aug. 13, 2010.
Slavenburg, G., U.S. Appl. No. 61/387,947, filed Sep. 29, 2010.
Notice of Preliminary Rejection from Korean Patent Application No. 10-2011-0078998, dated Aug. 10, 2012.
Final Office Action from U.S. Appl. No. 12/854,100 dated Aug. 27, 2012.
Schutten, R., U.S. Appl. No. 61/387,948, filed Sep. 29, 2010.
Slavenburg, G. A., U.S. Appl. No. 12/901,447 filed Oct. 8, 2010.
Final Office Action from U.S. Appl. No. 12/765,771, dated Jan. 7, 2013.
Notice of Allowance from U.S. Appl. No. 12/765,771, dated Jun. 24, 2013.
Advisory Action from U.S. Appl. No. 12/765,771, dated Apr. 25, 2013.
Final Office Action from U.S. Appl. No.. 12/787,346, dated Jan. 9, 2013.
Notice of Allowance from U.S. Appl. No. 12/787,346, dated Jul. 9, 2013.
Advisory Action from U.S. Appl. No. 12/787,346, dated Apr. 25, 2013.
Non-Final Office Action from U.S. Appl. No. 12/892,147, dated Dec. 31, 2012.
Non-Final Office Action from U.S. Appl. No. 12/892,147, dated Dec. 5, 2013.
Final Office Action from U.S. Appl. No. 12/892,147, dated Sep. 4, 2013.
Notice of Allowance from U.S. Appl. No. 12/892,147, dated Jul. 18, 2014.
Decision to Refuse from European Patent Application No. 07754251.2, dated Apr. 11, 2013.
Summons to Attend Oral Proceedings from European Patent Application No. 07754251.2, dated Oct. 8, 2012.
Final Office Action from U.S. Appl. No. 13/311,451, dated Jun. 5, 2013.
Notice of Allowance from U.S. Appl. No. 13/311,451, dated Mar. 12, 2014.
Non-Final Office Action from U.S. Appl. No. 13/311,451, dated Oct. 22, 2013.
Non-Final Office Action from U.S. Appl. No. 13/311,451, dated Nov. 21, 2012.
Advisory Action from U.S. Appl. No. 13/311,451, dated Sep. 6, 2013.
Advisory Action from U.S. Appl. No. 12/854,100, dated Nov. 21, 2012.
Final Office Action from U.S. Appl. No. 12/854,100, dated Sep. 11, 2014.
Non-Final Office Action from U.S. Appl. No. 12/854,100, dated May 8, 2014.
Advisory Action from U.S. Appl. No. 13/208,290, dated Aug. 7, 2014.
Final Office Action from U.S. Appl. No. 13/208,290, dated Jun. 4, 2014.
Non-Final Office Action from U.S. Appl. No. 13/208,290, dated Dec. 5, 2013.
Examination Report from GB Patent Application No. GB1112746.1, dated Jul. 25, 2013.
Non-Final Office Action from U.S. Appl. No. 13/247,907, dated Sep. 10, 2014.
Non-Final Office Action from U.S. Appl. No. 13/444,783, dated Sep. 23, 2014.
Chen, Chun-Ho et al., "3-D Mobile Display Based on Moire-Free Dual Directional Backlight and Driving Scheme for Image Crosstalk Reduction," Journal of Display Technology, vol. 4, No. 1, Mar. 2008, pp. 92-96.
Notice of Allowance from U.S. Appl. No. 13/247,907, dated Mar. 19, 2015.
Final Office Action from U.S. Appl. No. 13/444,783, dated Mar. 30, 2015.
Notice of Allowance from Japanese Patent Application No. 2011-161191, dated Apr. 7, 2015.
Non-Final Office Action from U.S. Appl. No. 12/854,100, dated Mar. 6, 2015.

* cited by examiner

SYSTEM, METHOD, AND COMPUTER PROGRAM PRODUCT FOR INVERTING A POLARITY OF EACH CELL OF A DISPLAY DEVICE

RELATED APPLICATION(S)

The present application claims the priority of a previously filed provisional application filed Sep. 29, 2010 under Ser. No. 61/387,947, which is incorporated herein by reference in its entirety.

FIELD OF THE INVENTION

The present invention relates to display systems, and more particularly to display systems operating in a three-dimensional display mode.

BACKGROUND

Traditionally, display systems include display panel cells that are direct current (DC) driven. Further, these display panel cells are driven with an alternating drive voltage polarity on each frame. Additionally, when a display for the display system is operating in a frame sequential method for displaying a three-dimensional image, the display may receive a different pixel value for each frame.

For example, a region of cells may be black (e.g. G0) in a left eye view, and the same region of cells may be gray (e.g. G160) in a right eye view. Further, in the context of the current example, for such a region, each cell of the display may be alternately driven across as G0, G160, G0, and G160, switching the value every frame. Additionally, since a cell value changes and the drive voltage polarity alternates for the cell for each frame, a direct current imbalance may occur causing a slow luminance drift of the cell, where an intensity of the cell slowly drifts to a stable value over a time period.

Therefore, the slow luminance drift for a cell presents a problem for display systems operating in a three-dimensional display mode and there is thus a need for addressing these and/or other issues associated with the prior art.

SUMMARY

A system, method, and computer program product are provided for determining that a display device is operating in a three-dimensional mode. Further, in response to the determination that the display device is operating in the three-dimensional mode, inverting a polarity of each cell of the display device every N number of frames. Additionally, the N number of frames is even and includes at least two frames.

DETAILED DESCRIPTION

Figure 1:
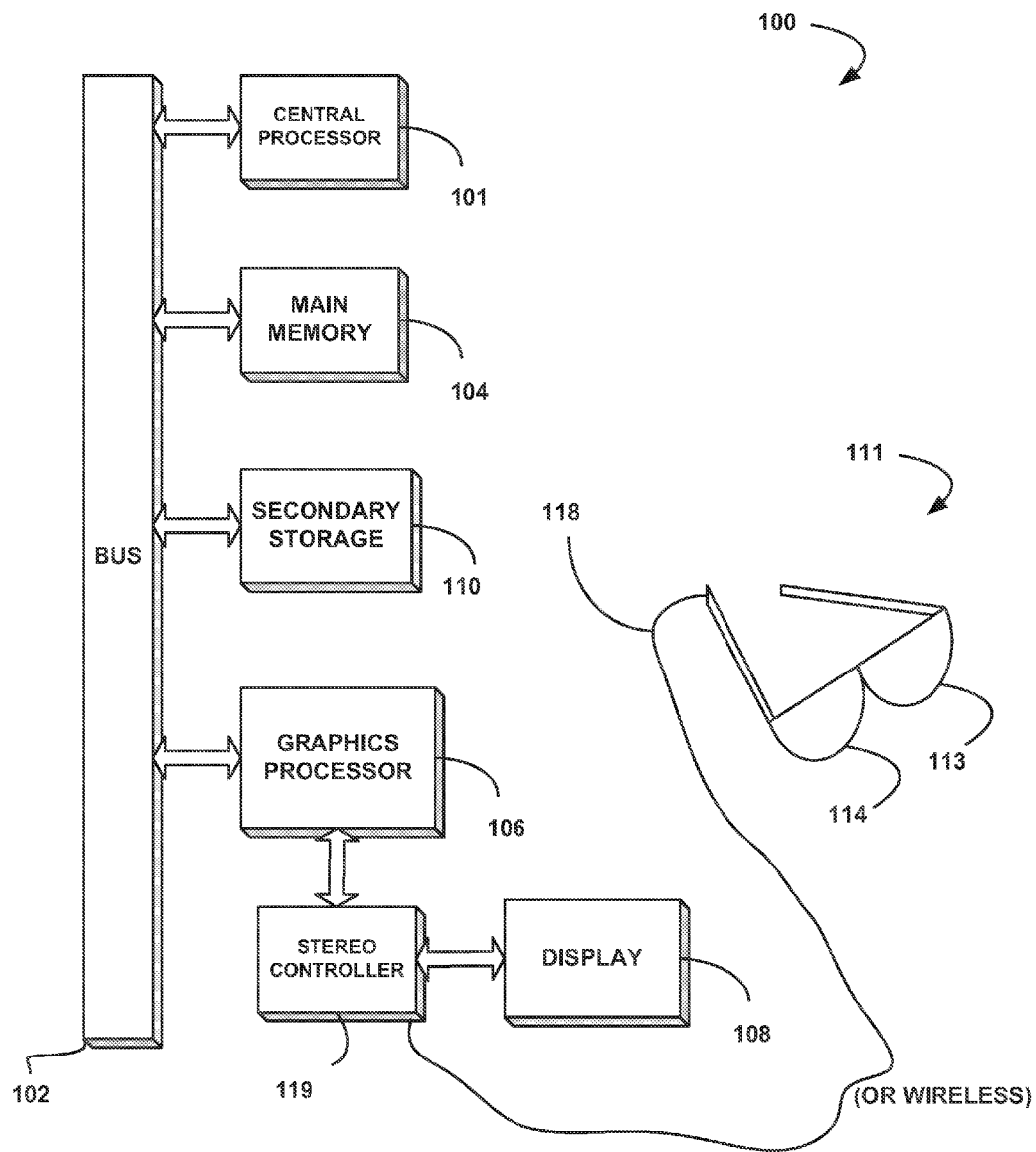
FIG. 1 illustrates an exemplary computer system in which the various architecture and/or functionality of various embodiments may be implemented.

FIG. 1 illustrates an exemplary computer system 100 in which the various architecture and/or functionality of various embodiments may be implemented. As shown, a computer system 100 is provided including at least one host processor 101, which is connected to a communication bus 102. The computer system 100 also includes a main memory 104. Control logic (software) and data are stored in the main memory 104 which may take the form of random access memory (RAM).

The computer system 100 also includes a graphics processor 106 and a display 108 in the form of a liquid crystal display (LCD), digital light processing (DLP) display, liquid crystal on silicon (LCOS) display, organic light emitting diode (OLED) display, plasma display, or other similar display. In one embodiment, the graphics processor 106 may include a plurality of shader modules, a rasterization module, etc. Each of the foregoing modules may even be situated on a single semiconductor platform to form a graphics processing unit (GPU).

In the present description, a single semiconductor platform may refer to a sole unitary semiconductor-based integrated circuit or chip. It should be noted that the term single semiconductor platform may also refer to multi-chip modules with increased connectivity which simulate on-chip operation, and make substantial improvements over utilizing a conventional central processing unit (CPU) and bus implementation. Of course, the various modules may also be situated separately or in various combinations of semiconductor platforms per the desires of the user.

The computer system 100 may also include a secondary storage 110. The secondary storage 110 includes, for example, a hard disk drive and/or a removable storage drive, representing a floppy disk drive, a magnetic tape drive, a compact disk drive, etc. The removable storage drive reads from and/or writes to a removable storage unit in a well known manner.

Computer programs, or computer control logic algorithms, may be stored in the main memory 104 and/or the secondary storage 110. Such computer programs, when executed, enable the computer system 100 to perform various functions. Main memory 104, secondary storage 110 and/or any other storage are possible examples of computer-readable media.

Further included is a pair of shutter glasses 111 capable of being worn on a face of a user. While the shutter glasses 111 are shown to include two elongated members for supporting the same on the face of the user, it should be noted that other constructions (e.g. member-less design, head strap, helmet, etc.) may be used to provide similar or any other type of support. As further shown, the shutter glasses 111 also include a right eye shutter 114 and a left eye shutter 113.

Both the right eye shutter 114 and left eye shutter 113 are capable of both an open orientation and a closed orientation. In use, the open orientation allows more light therethrough with respect to the closed orientation. Of course, such orientations may be achieved by any desired mechanical, electrical, optical, and/or any other mechanism capable of carrying out the above functionality.

For control purposes, the shutter glasses 111 may be coupled to a stereo controller 119 via a cable 118 (or without the cable 118 in a wireless environment). As an example, in the wireless environment, the shutter glasses 111 may be in communication with an emitter coupled to the stereo controller 119, the communication bus 102, etc. The stereo controller 119 is, in turn, coupled between the graphics processor 106 and the display 108 for carrying out the functionality to be set forth hereinafter. While the stereo controller 119 is shown to reside between the graphics processor 106 and the display 108, it should be noted that the stereo controller 119 may reside in any location associated with the computer system 100, the shutter glasses 111, and/or even in a separate module, particularly (but not necessarily) in an embodiment where the graphics processor 106 is attached to a separate interface [e.g. universal serial bus (USB), etc.] on the computer system 100. In one embodiment, the display 108 may be directly connected to the computer system 100, and the stereo controller 119 may further be directly connected to the computer system 100 via a USB interface. Still yet, the stereo controller 119 may comprise any hardware and/or software capable of the providing the desired functionality.

Specifically, in some embodiments, the right eye shutter 114 and left eye shutter 113 are controlled to switch between the closed orientation and the open orientation. As an option, the right eye shutter 114 and left eye shutter 113 of the shutter glasses 111 may be controlled such that the right eye shutter 114 and left eye shutter 113 simultaneously remain in the closed orientation for a predetermined amount of time.

In addition to and/or instead of the foregoing technique, the stereo controller 119, the display 108, and/or any other appropriate hardware/software associated with the computer system 100 may be equipped with functionality for adapting the display 108 in a way that enhances a viewing experience when display content is viewed utilizing the shutter glasses 111.

For example, in one embodiment, the architecture and/or functionality of the various following figures may be implemented in the context of the host processor 101, graphics processor 106, a chipset (i.e. a group of integrated circuits designed to work and sold as a unit for performing related functions, etc.), and/or any other integrated circuit for that matter. Still yet, the architecture and/or functionality of the various following figures may be implemented in the context of a general computer system, a circuit board system, a game console system dedicated for entertainment purposes, an application-specific system, and/or any other desired system.

For example, the system 100 may take the form of a desktop computer, lap-top computer, and/or any other type of logic. Still yet, the system 100 may take the form of various other devices including, but not limited to, a personal digital assistant (PDA) device, a tablet, a mobile phone device, a television, etc.

Further, while not shown, the system 100 may be coupled to a network [e.g. a telecommunications network, local area network (LAN), wireless network, wide area network (WAN) such as the Internet, peer-to-peer network, cable network, etc.) for communication purposes.

More illustrative information will now be set forth regarding various optional architectures and features with which the foregoing framework may or may not be implemented, per the desires of the user. It should be strongly noted that the following information is set forth for illustrative purposes and should not be construed as limiting in any manner. Any of the following features may be optionally incorporated with or without the exclusion of other features described.

Figure 2:
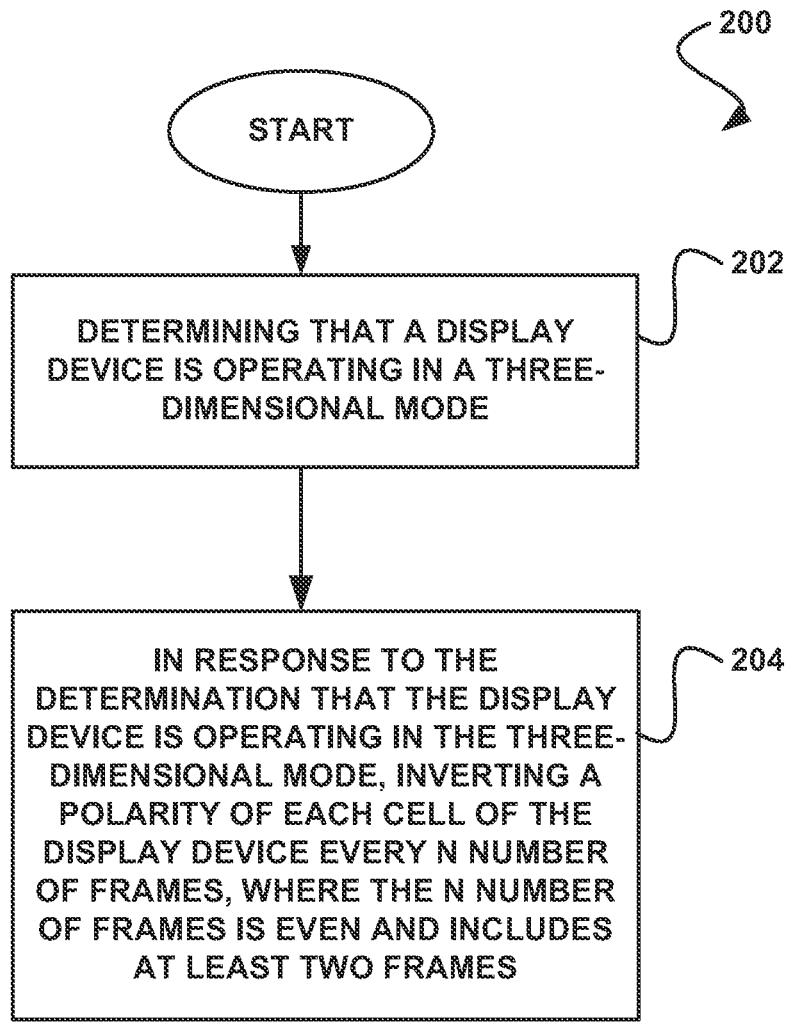
FIG. 2 shows a method for inverting a polarity of each cell of a display device, in accordance with one embodiment.

FIG. 2 shows a method 200 for inverting a polarity of each cell of a display device, in accordance with one embodiment. As an option, the present method 200 may be implemented in the context of the functionality and architecture of FIG. 1. Of course, however, the method 200 may be carried out in any desired environment. It should also be noted that the aforementioned definitions may apply during the present description.

As shown in operation 202, it is determined that a display device is operating in a three-dimensional mode. In the context of one embodiment, the display device may include a computer display, a display panel of a portable device, a television display, or any other display such as the display 108 of FIG. 1. Optionally, the display device may include a liquid crystal display (LCD).

Furthermore, as an option, the display device may include a stereo capable display device. As yet another option, the stereo capable display device may display content for viewing with shutter glasses. For example the shutter glasses may include the shutter glasses 111 of FIG. 1, etc.

Additionally, in another embodiment, the display device may be capable of operating in a two-dimensional mode. As an option, when the display device is operating in a two-dimensional mode, the display device may display a sequence of frames intended for viewing by at least one viewer. For example, when the display device is operating in the two-dimensional mode, the display device may display a series of frames that are each intended for viewing by both eyes of the viewer.

Furthermore, in accordance with yet another embodiment, the display device may be capable of operating in a three-dimensional mode. Optionally, when the display device is operating in the three-dimensional mode, the display device may display a series of frames in a frame sequential manner. As an example, displaying the series of frames in the frame sequential manner may include displaying a first frame intended for one eye of the viewer, then displaying a second frame intended for another eye of the viewer. Further, as yet another example, when the display device is operating in the three-dimensional mode, the display device may display a left eye frame intended for viewing by a left eye of the viewer, followed by a right eye frame intended for viewing by a right eye of the viewer. Additionally, as yet another option, when the device is operating in the three-dimensional mode, the display device may display content for viewing with the shutter glasses (e.g. the shutter glasses 111 of FIG. 1, etc.).

Additionally, the operating mode of the display device may be determined by the display device. Optionally, the display device may determine the current operating mode of the display device by reading a register, a setting, an attribute, etc. associated with the display device. In addition, the operating mode of the display device may be indicated in a firmware of the display device. For example, the firmware of the display device may instruct the display device to operate in the two-dimensional mode or the three-dimensional mode. Furthermore, the operating mode of the display device may be indicated to the display device by another device (e.g. a graphics processing unit of FIG. 1, etc.) in communication with the display device. Still yet, the operating mode of the display device may be indicated to the display device by a driver in communication with the display device.

Further, in response to the determination that the display device is operating in the three-dimensional mode, a polarity of each cell of the display device is inverted every N number of frames. In the present description, the N number of frames is even and includes at least two frames. See operation 204. Optionally, the N number of frames may include at least four frames, at least six frames, at least eight frames, etc.

Additionally, in one embodiment, the N number of frames may include at least one left eye frame and at least one right eye frame. Optionally, the N number of frames may include a same number of left eye frames and right eye frames. For example, if the N number of frames includes four frames, then the N number of frames may include a first left eye frame, a first right eye frame, a second left eye frame, and a second right eye frame.

In addition, the polarity (e.g. a drive polarity, etc.) of each cell of the display device may include a positive polarity (e.g. +) or a negative polarity (e.g. −). For example, the polarity of each cell of the display device may include a positive voltage (e.g. +V) or a negative voltage (e.g. −V). Optionally, the inverting of the polarity of each cell of the display device may include changing the positive polarity to the negative polarity. Further, as another option, the inverting of the polarity of each cell of the display device may include changing the negative polarity to the positive polarity. For example, if the N number of frames includes two frames, a voltage polarity of a particular cell for a first frame and a second frame may be positive, a voltage polarity of the particular cell for a third frame and a fourth frame may be negative, a voltage polarity of the particular cell for a fifth frame and a sixth frame may be positive, etc. (e.g. +V, +V, −V, −V, +V, +V, etc.). Still, as another option, the N number of frames may indicate that the particular cell is driven with the positive polarity for the N number of frames followed by the particular cell being driven for with the negative polarity for the N number of frames.

Furthermore, as yet another option, cells of the display device may be direct current (DC) neutral driven by inverting the polarity of each cell of the display device every N number of frames. For example, the display device may include a plurality of cells that are direct current balanced when an average value of a current for each cell is zero over the N number of frames where the cell is driven with a positive polarity and the N number of frames where the cell is driven with a negative polarity. Additionally, the cells of the display device may output a consistent luminance in response to the cells being direct current balanced over the N number of frames where the cell is driven with the positive polarity and the N number of frames where the cell is driven with the negative polarity. Optionally, each pixel of the display device may include at least one cell of the display device. For example, each pixel of the display device may include three cells of the display device, the three cells including a red cell, a green cell, and a blue cell.

As another example, each cell of the display device may be direct current balanced when an average value of a current for each cell over the N number of frames where the cell is driven with the positive polarity and the N number of frames where the cell is driven with the negative polarity is zero. Further, in the context of the current example, each of the cells of the display device may output a consistent luminance in response to each of the cells being direct current balanced over the N number of frames where the cell is driven with the positive polarity and the N number of frames where the cell is driven with the negative polarity.

In addition, in one embodiment, the display device may control the polarity inversion. As an option, the polarity inversion may be indicated in the display device. Further, as another option, an attribute of the polarity inversion may be stored in association with the display device. For example, the attribute of the polarity inversion may be stored in a register, a setting, a firmware, and/or any other storage associated with the display device.

Additionally, in another embodiment, a driver may be capable of updating the attribute of the polarity inversion. Furthermore, in yet another embodiment, the polarity inversion may be enabled by a firmware associated with the display device. Optionally, the firmware may be updated to enable the polarity inversion of the display device. As yet another option, the firmware associated with the display device may instruct the display device to invert the polarity of each of the cells of the display device every N number of frames when operating in the three-dimensional mode. Further, as still yet another option, the firmware associated with the display device may instruct the display device to invert the polarity of each of the cells of the display device every frame when operating in the two-dimensional mode.

More illustrative information will now be set forth regarding various optional architectures and features with which the foregoing framework may or may not be implemented, per the desires of the user. It should he strongly noted that the following information is set forth for illustrative purposes and should not be construed as limiting in any manner. Any of the following features may be optionally incorporated with or without the exclusion of other features described.

Figure 3:
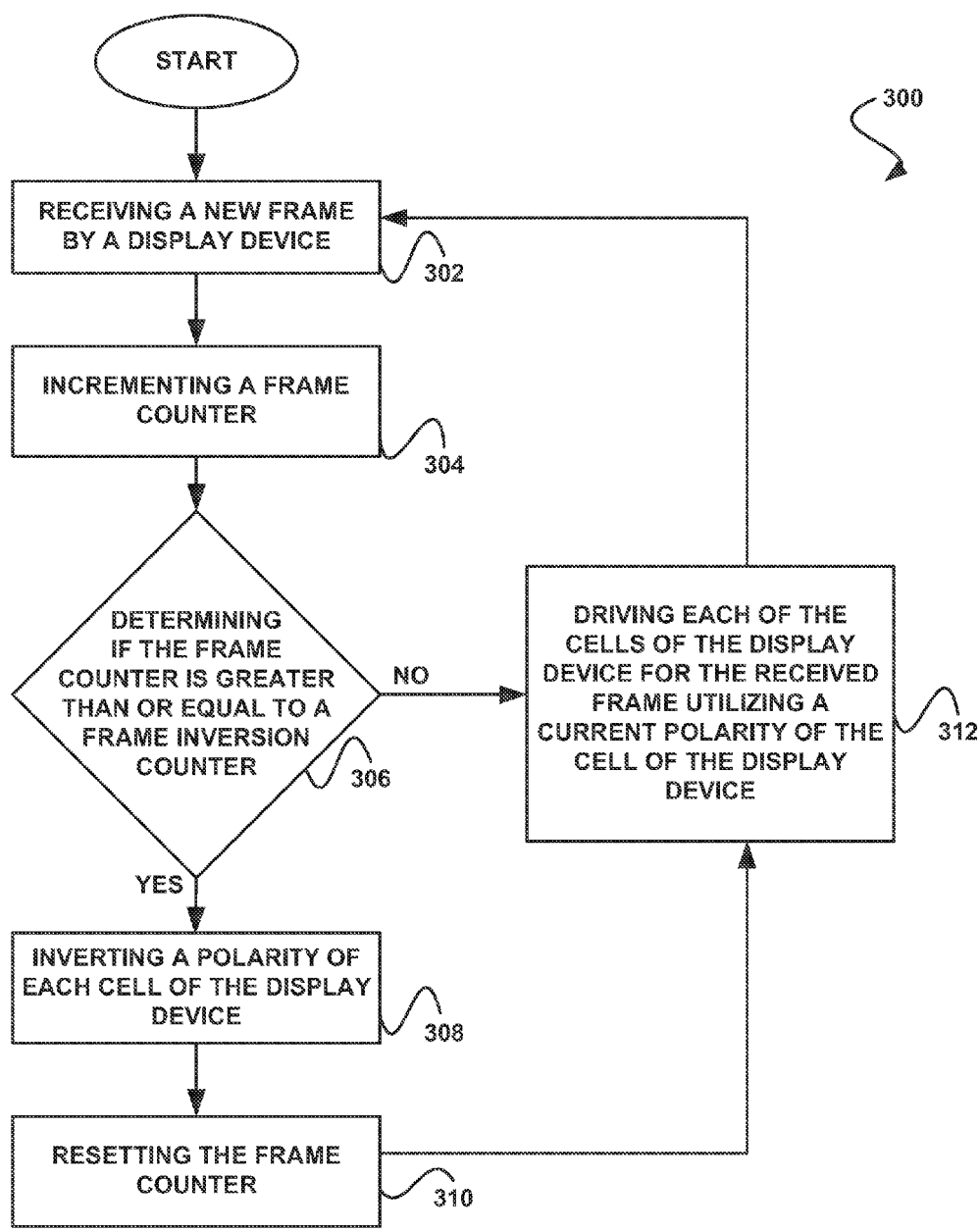
FIG. 3 shows a method for inverting a polarity of each cell of a display device, in accordance with another embodiment.

FIG. 3 shows a method 300 for inverting a polarity of each cell of a display device, in accordance with another embodiment. As an option, the present method 300 may be implemented in the context of the functionality and architecture of FIGS. 1-2. Of course, however, the method 300 may be carried out in any desired environment. It should also be noted that the aforementioned definitions may apply during the present description.

As shown in operation 302, a new frame is received by the display device. As an option, the new frame may be received by the display device when the display device is operating in a three-dimensional mode. Optionally, the three-dimensional mode may include displaying a three-dimensional image utilizing a frame sequential method. Further, the frame sequential method may include displaying a frame for a left eye, in sequence with displaying a frame for a right eye.

For example, utilizing a frame sequential method, a region of cells of the display device may be black (e.g. gray value 0 (G0)) in a first frame intended for a left eye, and the same region of cells of the display device may be gray (e.g. gray value 160 (G160)) in a second frame intended for a right eye. In the context of the current example, for the region of cells, each cell may be driven as G0, G160, G0, G160, etc. switching a value each frame.

Further, when the display device is operating in a three-dimensional mode, a frame inversion counter may be set to a number of frames to display before inverting a polarity of each of the cells of the display device. In addition, the number of frames to display may be an even multiple of two. For example, when operating in the three-dimensional mode, the frame inversion counter may be set to invert the polarity of each of the cells of the display device every two frames, every four frames, every six frames, etc.

As an option, the new frame may be received from a graphics processing unit. Further, each new frame may include at least one region of pixels. For example, the graphics processing unit may send the region of pixels of the display device as G0 in a first frame, G160 in a second frame, G0 in a third frame, G160 in a fourth frame, etc. Further, the display device may drive cells associated with the region of pixels as G0 in the first frame, G160 in the second frame, G0 in the third frame, G160 in the fourth frame, etc.

In addition, after receiving a new frame, a frame counter is incremented. See operation 304. As yet another option, the frame counter may be included in the display device. Further, as still yet another option, the frame counter may be maintained in a firmware of the display device, a memory of the display device, in a memory by a driver associated with the graphics processing unit, the graphics processing unit, or any other device in communication with the display device, the firmware, the driver, and/or the graphics processing unit.

Furthermore, as shown in decision 306, it is determined if the frame counter is greater than or equal to the frame inversion counter. Additionally, if the frame counter is greater than or equal to the frame inversion counter, then the polarity of each of the cells of the display device is inverted. See operation 308. Optionally, inverting the polarity of each of the cells of the display device may include indicating to the display device that the polarity should be inverted for each of the cells prior to displaying the current frame. For example, if the display device, which used a negative voltage to drive a particular cell of the display device for a previous frame, receives a frame and the frame counter is equal to the frame inversion counter, then the display device will invert the negative voltage and utilize a positive voltage to drive the particular cell of the display device for the received frame. As another example, if the frame inversion counter is equal to two, then the voltage polarity sequence for the particular cell of the display device may include +V, +V, −V, −V, +V, +V, etc.

Further, in one embodiment, the cells of the display device may be grouped into sets of cells that are driven with a same voltage polarity. Furthermore, in the context of the current embodiment, the voltage polarity of each set of cells may alternate every N frames. As an option, the set of cells may include a row of cells of the display device, multiple rows of cells of the display device, a column of cells of the display device, multiple columns of cells of the display device, or any two-dimensional shape of cells of the display device. For example, the cells of the display device may be grouped into a checkerboard pattern, where each group of cells may be driven with a different voltage polarity than adjacent groups of cells. As another example, the cells of the display device may be grouped into rows, where a first group of cells that includes a first row of cells that is driven with a positive polarity for a first frame, a second group of cells that includes a second row of cells that is driven with a negative polarity for the first frame, a third group of cells that includes a third row of cells that is driven with a positive polarity for the first frame, etc. Further, in the context of the current example, the voltage polarity for the first group of cells, the second group of cells, the third group of cells, etc. may alternate every N frames.

In addition, the frame counter is reset. See operation 310. As an option, resetting the frame counter may include setting the frame counter to zero. Additionally, in another embodiment, the inverting of the polarity of each of the cells of the display device may utilize any method for keeping track of a number of frames since a last polarity inversion of each of the cells of the display device (e.g. a mathematical formula utilizing the frame counter, a register, an indicator associated with the received frame, etc.).

Furthermore, as shown in operation 312, the display device drives each cell of the display device for the received frame utilizing a current polarity of the cell of the display device. Additionally, as shown in decision 306, if the frame counter is less than the frame inversion counter, then the display device drives each cell of the display device for the received frame utilizing the current polarity of the cell of the display device. Optionally, if the polarity of the cell of the display device was inverted prior to the display device driving the cell (e.g. as in operation 308 of FIG. 3), then the current polarity of cell includes the inverted polarity. In addition, each cell of the display device for the frame is driven utilizing the current polarity of the cell of the display device, the method 300 returns to operation 302 where a new frame is received.

Figure 4:
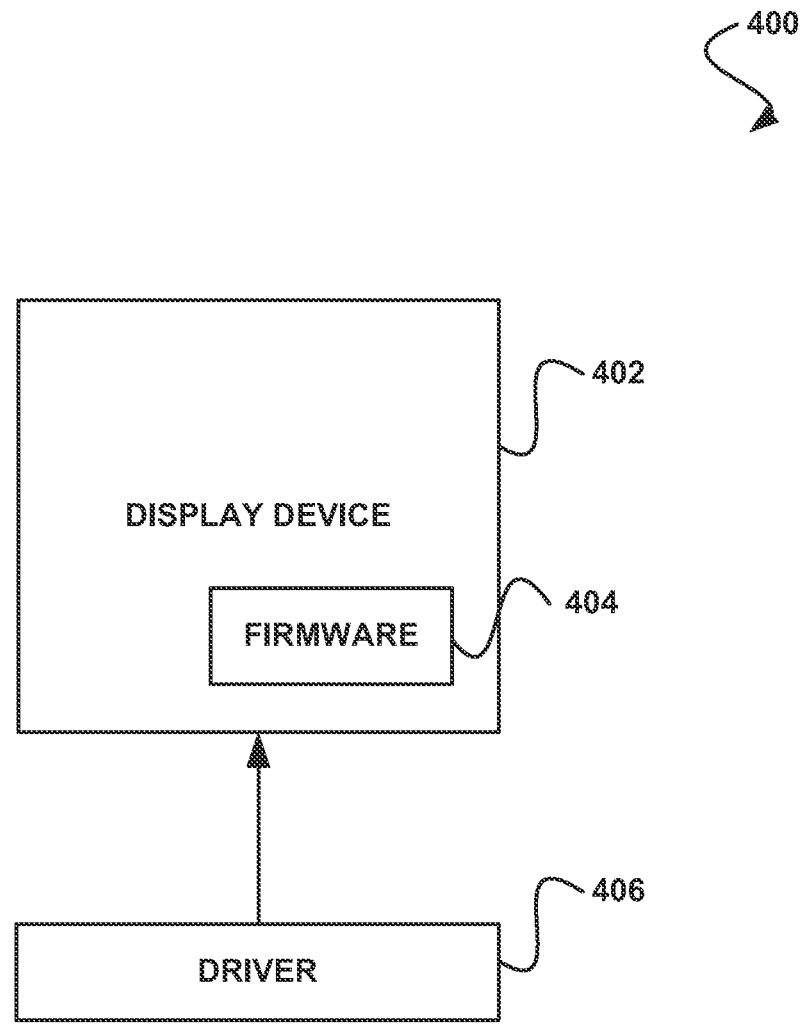
FIG. 4 shows a system for inverting a polarity of each cell of a display device, in accordance with yet another embodiment.

FIG. 4 shows a system 400 for inverting a polarity of each cell of a display device, in accordance with yet another embodiment. As an option, the present system 400 may be implemented in the context of the functionality and architecture of FIGS. 1-3. Of course, however, the system 400 may be implemented in any desired environment. It should also be noted that the aforementioned definitions may apply during the present description.

In one embodiment, the system 400 may include a display device 402. Additionally, as another option, the display device 402 may utilize NVIDIA® vertical position dependent LCD over drive technology in order to eliminate top and/or bottom screen ghosting, for example, as disclosed in U.S. patent application Ser. No. 12/901,447, by Gerrit A. Slavenburg, filed Oct. 8, 2010, and entitled "System, Method, And Computer Program Product For Utilizing Screen Position Of Display Content To Compensate For Crosstalk During The Display Of Stereo Content". Furthermore, in still yet another option, the display device 402 may incorporate backlight boosting technology in order to reduce power consumption while maintaining a same brightness in a third-dimension or to create additional brightness in the third-dimension while using the same power consumption, for example, as disclosed in U.S. patent application Ser. No. 12/892,147, by Slavenburg et al., filed Sep. 28, 2010, and entitled "System, Method, And Computer Program Product For Controlling Stereo Glasses Shutters"; and U.S. patent application Ser. No. 12/854,100, by Gerrit A. Slavenburg, filed Aug. 10, 2010, and entitled "System, Method, And Computer Program Product For Activating A Backlight Of A Display Device Displaying Stereoscopic Display Content".

As an option, the display device 402 may be capable of operating in a two-dimensional mode and/or a three-dimensional mode. Further, the display device 402 may include a firmware 404. Optionally, the firmware 404 may include any sort of logic, software, programs, processes, etc. in association with the display device 402. As shown in FIG. 4, the firmware 404 is a component of the display device 402. Further, the firmware 404 may instruct the display device 402 as to when the display device 402 should perform polarity inversion.

Furthermore, in accordance with the current embodiment, the system 400 may include a driver 406. As an option, the driver 406 may be in communication with the display device 402. Further, as another option, the driver 406 may be in communication with the firmware 404 of the display device 402. Optionally, the driver 406 may communicate with the firmware 404 utilizing a communication protocol. As an example, the driver 406, utilizing the communication protocol, may indicate to the firmware 404 that the display device 402 should be operating in the two-dimensional mode or the three-dimensional mode. Furthermore, the driver 406 may control a graphics processing unit that is in communication with the display device 402 and/or the firmware 404.

Additionally, in another embodiment, the driver 406 may be capable of updating the firmware 404 of the display device 402. Optionally, the driver 406 may update the firmware 404 with a new firmware. As another option, an application associated with the display device 402 may be utilized to update the firmware 404 with the new firmware. As an option, the new firmware may include different settings, capabilities, functions, etc. than the firmware 404.

Further, in one embodiment, the driver 406 may indicate to the firmware 404 that the display device 402 should perform polarity inversion for each cell every N frames. Optionally, the driver 406 may indicate to the firmware 404 that the display device 402 should perform polarity inversion for each cell every N frames based on a display mode. For example, the firmware 404 may indicate that the display device 402 should perform polarity inversion for each cell every frame when operating in a two-dimensional mode. As another example, the firmware 404 may indicate that the display device 402 should perform polarity inversion for each cell every two frames when operating in a three-dimensional mode. Of course, in the context of the current example, the driver 406 may indicate to the firmware 404 a frame interval for performing polarity inversion for each cell when the display device 402 is operating in the two-dimensional mode, and another frame interval for performing polarity inversion for each cell when the display device 402 is operating in the three-dimensional mode. Further, as yet another example, the firmware 404 may enable the polarity inversion for each cell of the display device 402.

Additionally, in another embodiment, the driver 406 may update a setting associated with the display device 402. As an option, the display device 402 and/or the firmware 404 may utilize the setting to indicate that the display device 402 should perform the polarity inversion for each cell every N frames. In yet another embodiment, the driver 406 may indicate to the graphics processing unit to instruct the display device 402 to perform the polarity inversion for each cell every N frames.

Figure 5:
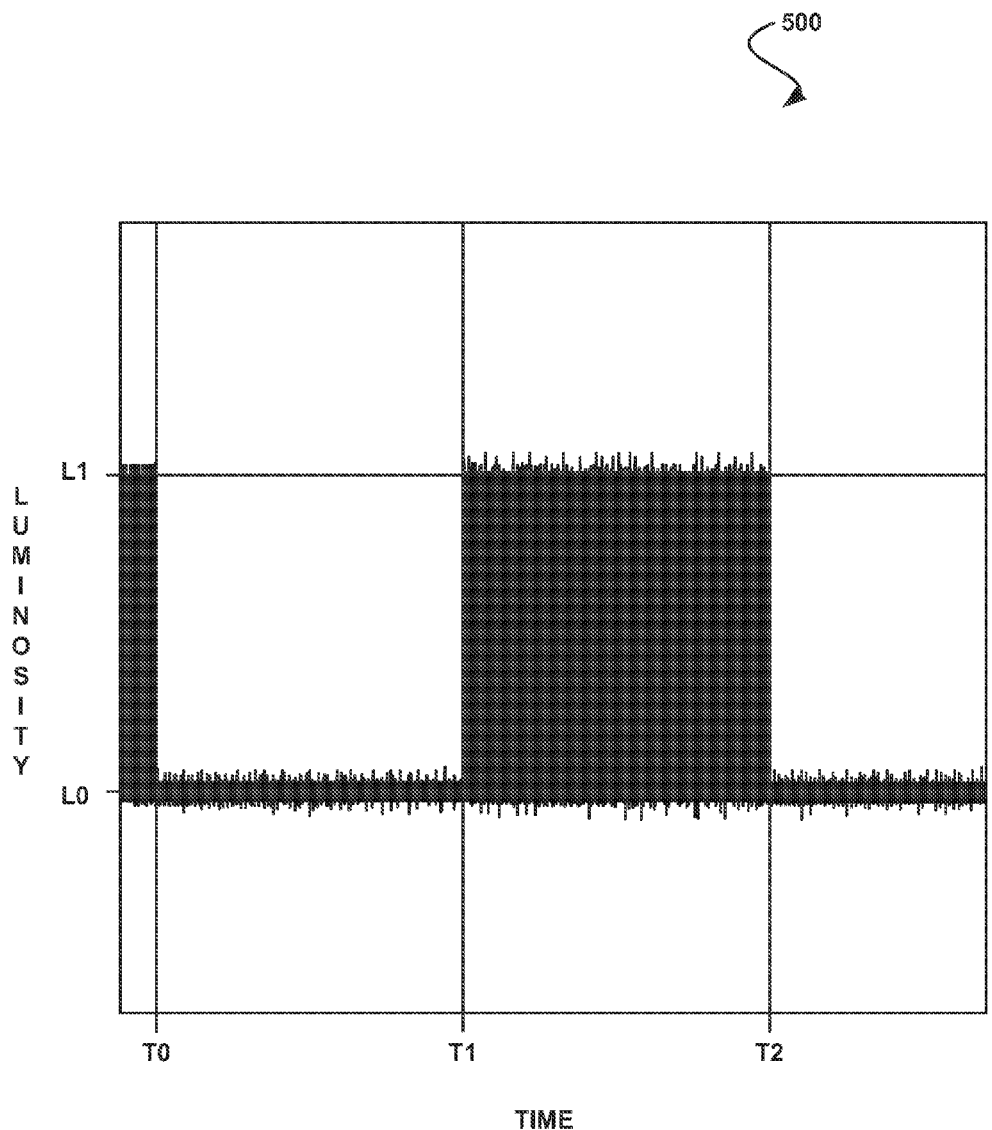
FIG. 5 shows an example of luminosity over time of a portion of a display device inverting a polarity of each cell of the display device every other frame, in accordance with still yet another embodiment.

FIG. 5 shows an example 500 of luminosity over time of a portion of a display device inverting a polarity of each cell of the display device every other frame, in accordance with still yet another embodiment. As an option, the present example 500 may result from an implementation in the context of the functionality and architecture of FIGS. 1-4. Of course, however, the example 500 may result from an implementation of any of the aforementioned embodiments. It should also be noted that the aforementioned definitions may apply during the present description.

As an example, luminosity over time of a portion of a display device is shown in example 500. Further, in the context of the current example, the display device is operating in a three-dimensional mode and is inverting the polarity of each cell of the display device every other frame, which allows for each cell of the display device to be direct current balanced.

In the context of the current example, starting at time T0 until time T1, a first plurality of frames is displayed. Additionally, a portion of the first plurality of frames is displayed with a value of G0. Further, an average luminosity for the portion of the first plurality of frames that displayed the value of G0 is indicated as L0.

Additionally, in the context of the current example, starting at time T1 until time T2, a second plurality of frames is displayed. In addition, a portion of the second plurality of frames is displayed with a value that alternates between G0 and G160 every frame. In addition, an average luminosity for the portion of the second plurality of frames that displayed the value of G160 is indicated as L1.

Thus, as illustrated in example 500, when the display device is operating in the three-dimensional mode, inverting the polarity of the cells of the display device every other frame may allow for the cells of the display device to be direct current balanced. Further, a consistent luminosity for each cell of the portion of a frame may be maintained for an entire duration of the second plurality of frames.

As yet another example, for a region of cells of the display device, a stereo driver (e.g. associated with a graphics processing unit) may be driving G0 for a region of pixels that includes the region of cells of a first frame, G160 for the region of pixels that includes the region of cells of a second frame, G0 for the region of pixels that includes the region of cells of a third frame, and G160 for the region of pixels that includes the region of cells of a fourth frame. Further, in the context of the current example, the display device may translate G0 to 27 volts (27V) and G160 to 10V. Additionally, in the context of the current example, with a frame inversion interval of every other frame, the display device may be driving voltage polarity for a particular set of cells included in the region of cells as +V, +V, −V, and V. Therefore, in the current example, the particular set of cells in the region of cells of the display device may receive +27V, +10V, −27V, and −10V, which may result in a direct current balance for the particular set of cells in the region of cells of the display device since a sum of the voltages for the particular set of cells in the region of cells for the frames is 0V. Further, as an option, a torque of an LCD molecule of the display device may be proportional to the voltage squared.

Additionally, as yet another example, a computer with a 3D driver (e.g. NVIDIA® 3D driver) may include a stereoscopic photo viewer and two stereo images. In the context of the current example, a first image may include an all black image (e.g. G0) for both a left eye and right eye, and a second image may include an all black-image (e.g. G0) for both the left eye and right eye, with a gray square (e.g. G160) in the center of the second image for the right eye. Further, in the context of the current example, the stereoscopic photo viewer may be started and switched to a full screen mode, and the two stereo images may be loaded so the two stereo images may be switched between using a key. Still yet, in the context of the current example, a luminance camera may be pointed at the display device and a scope may be connected. Furthermore, in the context of the current example, to capture a luminance using a second/division time-scale (e.g. 2 sec/div), the scope may be started to capture the luminance of the display device, the first all black image may be displayed for a period of time (e.g. for a minute and then the second image may be displayed. Additionally, in the context of the current example, the scope may observe a consistent luminance for the second image being displayed by the display device while the display device is utilizing a polarity inversion of the cells every two frames.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A computer program product embodied on a non-transitory computer readable medium, comprising:
   computer code for determining that a display device is operating in a three-dimensional mode;
   computer code for receiving a plurality of frames;
   computer code for, in response to receiving each frame, incrementing a frame counter;
   computer code for resetting the frame counter when the frame counter is greater than or equal to a frame inversion counter; and
   computer code for, in response to the determination that the display device is operating in the three-dimensional mode, inverting a polarity of each cell of the display device every N number of frames;
   wherein the N number of frames is even and includes at least two frames and the frame inversion counter is set to N.

2. The computer program product of claim 1, wherein the display device includes a liquid crystal display.

3. The computer program product of claim 1, wherein the display device includes a stereo capable display device.

4. The computer program product of claim 3, wherein the stereo capable display device displays content for viewing with shutter glasses.

5. The computer program product of claim 1, wherein the display device includes one of a computer display monitor, a display panel of a portable device, and a television display.

6. The computer program product of claim 1, wherein each cell of the display device is direct current balanced when an average value of a current for each cell over the N number of frames where the cell is driven with a positive polarity and the N number of frames where the cell is driven with a negative polarity is zero.

7. The computer program product of claim 6, wherein each of the cells of the display device output a consistent luminance in response to each of the cells being direct current balanced over the N number of frames where the cell is driven with the positive polarity and the N number of frames where the cell is driven with the negative polarity.

8. The computer program product of claim 1, wherein the display device is capable of operating in one of a two-dimensional mode and the three-dimensional mode.

9. The computer program product of claim 1, wherein the N number of frames includes at least one left eye frame and at least one right eye frame.

10. The computer program product of claim 1, wherein the N number of frames includes a same number of left eye frames and right eye frames.

11. The computer program product of claim 1, wherein each row of the display device includes a set of cells and each cell of the set of cells is driven with a different polarity than an adjacent set of cells.

12. The computer program product of claim 1, wherein the display device controls the polarity inversion.

13. The computer program product of claim 1, wherein the polarity inversion is indicated in the display device.

14. The computer program product of claim 1, wherein an attribute of the polarity inversion is stored in association with the display device.

15. The computer program product of claim 14, wherein a driver is capable of indicating the attribute of the polarity inversion to the display device.

16. The computer program product of claim 1, wherein the polarity inversion is enabled by a firmware associated with the display device and the firmware is updated to enable the polarity inversion of the display device.

17. The computer program product of claim 16, wherein the firmware associated with the display device instructs the display device to invert the polarity of each cell of the display device every N number of frames.

18. A method, comprising:
   determining that a display device is operating in a three-dimensional mode;
   receiving a plurality of frames;
   incrementing a frame counter in response to receiving each frame;
   resetting the frame counter when the frame counter is greater than or equal to a frame inversion counter; and
   in response to the determination that the display device is operating in the three-dimensional mode, inverting a polarity of each cell of the display device every N number of frames;
   wherein the N number of frames is even and includes at least two frames and the frame inversion counter is set to N.

19. A system, comprising:
   a processor configured to:
   set a frame inversion counter to N;
   increment a frame counter in response to receiving each frame; and
   reset the frame counter when the frame counter is greater than or equal to the frame inversion counter,
   determine that a display device is operating in a three-dimensional mode; and
   in response to determining that the display device is operating in the three-dimensional mode, invert a polarity of each cell of the display device every N number of frames;
   wherein the N number of frames is even and includes at least two frames and the processor remains in communication with memory and the display device via a bus.

* * * * *